US012804117B2

(12) United States Patent
Da Veiga et al.

(10) Patent No.: US 12,804,117 B2
(45) Date of Patent: Nov. 17, 2026

(54) TECHNIQUES FOR VIEWING 3D PHOTOS AND 3D VIDEOS

(71) Applicant: Apple Inc., Cupertino, CA (US)

(72) Inventors: Alexandre Da Veiga, San Francisco, CA (US); Alexander Menzies, Menlo Park, CA (US); Tobias Rick, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 355 days.

(21) Appl. No.: 18/367,660

(22) Filed: Sep. 13, 2023

(65) Prior Publication Data

US 2024/0007607 A1 Jan. 4, 2024

Related U.S. Application Data

(63) Continuation of application No. PCT/US2022/021243, filed on Mar. 22, 2022.
(Continued)

(51) Int. Cl.
*H04N 13/275* (2018.01)
*G06T 17/00* (2006.01)
(Continued)

(52) U.S. Cl.
CPC ........... *H04N 13/275* (2018.05); *G06T 17/00* (2013.01); *H04N 13/344* (2018.05);
(Continued)

(58) Field of Classification Search
CPC .. H04N 13/275; H04N 13/383; H04N 13/344; H04N 13/351; H04N 13/282; H04N 13/366; G06T 17/00; G09F 19/12
See application file for complete search history.

(56) References Cited

U.S. PATENT DOCUMENTS 5,661,599 A * 8/1997 Borner .................. G02B 30/27
348/E13.043
6,061,083 A * 5/2000 Aritake ................ H04N 13/117
348/E13.043
(Continued)

FOREIGN PATENT DOCUMENTS

CN 107820072 A 3/2018
CN 108989784 A 12/2018

OTHER PUBLICATIONS

Y. Liu, Q. Dai and W. Xu, "A Point-Cloud-Based Multiview Stereo Algorithm for Free-Viewpoint Video," in IEEE Transactions on Visualization and Computer Graphics, vol. 16, No. 3, pp. 407-418, May-Jun. 2010, doi: 10.1109/TVCG.2009.88. (Year: 2010).*
(Continued)

*Primary Examiner* — Charles L Beard
(74) *Attorney, Agent, or Firm* — Thompson Hine LLP

(57) ABSTRACT

Various implementations herein include devices, systems, and methods that determine and provide a transition (optionally including a transition effect) between different types of views of three-dimensional (3D) content. For example, an example process may include obtaining a 3D content item, providing a first view of the 3D content item within a 3D environment, determining to transition from the first view to a second view of the 3D content item based on a criterion, and providing the second view of the 3D content item within the 3D environment, where the left eye view and the right eye view of the 3D content item are based on at least one of the left eye content and the right eye content.

22 Claims, 4 Drawing Sheets

Related U.S. Application Data

(60) Provisional application No. 63/168,320, filed on Mar. 31, 2021.

(51) Int. Cl.
*H04N 13/344* (2018.01)
*H04N 13/351* (2018.01)
*H04N 13/383* (2018.01)
*H04N 13/00* (2018.01)

(52) U.S. Cl.
CPC ......... *H04N 13/351* (2018.05); *H04N 13/383* (2018.05); *H04N 2013/0081* (2013.01)

(56) References Cited

U.S. PATENT DOCUMENTS 6,304,286 B1 * 10/2001 Shirai .................... H04N 13/15 348/E13.043
7,804,498 B1 * 9/2010 Graham .................. G06T 11/26 345/419
8,587,641 B2 * 11/2013 Roth ...................... G02B 30/33 348/55
8,599,200 B2 * 12/2013 Yokote ................. H04N 13/359 348/54
8,704,879 B1 * 4/2014 Cheng ..................... G06F 3/013 348/51
8,717,423 B2 * 5/2014 Vesely .................... G06T 15/30 348/51
8,797,263 B2 * 8/2014 Kim .......................... G06T 7/50 345/157
9,191,658 B2 11/2015 Kato et al.
9,241,155 B2 * 1/2016 Stamate ............... H04N 13/376
9,420,257 B2 * 8/2016 Seol ..................... H04N 13/144
9,811,880 B2 11/2017 Mundhenk et al.
10,009,597 B2 * 6/2018 Karafin ................ H04N 13/111
10,257,504 B2 * 4/2019 Suzuki ................. H04N 13/373
10,298,921 B1 * 5/2019 Frayne ................... G02B 30/27
10,469,833 B2 * 11/2019 Hua ...................... G06T 19/006
10,838,206 B2 11/2020 Fortin-Deschênes et al.
11,048,977 B1 * 6/2021 Ulbricht .............. G06F 18/2155
11,170,521 B1 * 11/2021 Ben Himane ........... G06T 19/20
11,202,059 B2 * 12/2021 Kurata ................. H04N 13/378
11,232,644 B1 * 1/2022 Lee ......................... G06F 3/011
11,509,885 B2 * 11/2022 Kidoguchi ............. G02B 30/25
11,763,558 B1 9/2023 Casaburo
11,902,500 B2 * 2/2024 Karafin ................ H04N 13/368
12,051,147 B1 * 7/2024 Erze ........................ G06T 15/20
12,204,688 B2 * 1/2025 Kaku ................... H04N 13/368
12,254,579 B2 3/2025 Pease et al.
12,368,836 B2 * 7/2025 Sato ...................... H04N 13/282
12,395,620 B2 * 8/2025 Gaudreau .............. H04N 13/32
12,413,694 B2 * 9/2025 Tu ........................ H04N 13/128
2005/0052617 A1 * 3/2005 Fujikawa ............. H04N 13/305 359/462
2005/0213182 A1 * 9/2005 Cossairt ............... H04N 13/363 348/E13.058
2005/0253924 A1 * 11/2005 Mashitani ............ H04N 13/275 348/42
2006/0125917 A1 * 6/2006 Cha ...................... H04N 13/279 348/51
2006/0152435 A1 * 7/2006 Kondo ................... G03B 21/28 348/E5.143
2008/0218854 A1 * 9/2008 Hoshino .............. H04N 13/302 359/462
2008/0266523 A1 * 10/2008 Otsuka ................. H04N 13/349 348/E13.058
2009/0284585 A1 * 11/2009 Tsai ................... H04N 1/00129 348/48
2010/0060570 A1 * 3/2010 Underkoffler ............. G06T 7/00 382/103
2010/0142801 A1 * 6/2010 Koppal .................. H04N 13/10 382/154
2010/0171697 A1 * 7/2010 Son ...................... H04N 13/279 348/E13.001
2010/0225743 A1 * 9/2010 Florencio ............. H04N 13/398 348/46
2010/0315492 A1 * 12/2010 Baik .................... H04N 13/366 348/51
2011/0018976 A1 * 1/2011 Park ..................... H04N 13/122 348/51
2011/0050869 A1 * 3/2011 Gotoh .................... H04N 13/10 348/54
2011/0187723 A1 * 8/2011 Chen ....................... G06T 13/20 345/473
2011/0187831 A1 * 8/2011 Kim ..................... H04N 13/351 348/51
2011/0222757 A1 * 9/2011 Yeatman, Jr. ........ H04N 13/246 382/154
2012/0056872 A1 * 3/2012 Kim ..................... H04N 13/398 348/135
2012/0057778 A1 * 3/2012 Fukazawa ............ H04N 13/361 382/154
2012/0062556 A1 * 3/2012 Yamamoto ........... H04N 13/366 345/419
2012/0146897 A1 * 6/2012 Yoshida ................. G02B 30/56 345/156
2013/0095920 A1 * 4/2013 Patiejunas ............ H04N 13/271 463/31
2013/0127832 A1 * 5/2013 Lee ...................... H04N 13/207 345/419
2013/0293691 A1 * 11/2013 Saito ...................... G09G 3/003 348/59
2013/0321564 A1 * 12/2013 Smith ................... G06T 15/205 348/14.08
2013/0321586 A1 * 12/2013 Kirk ..................... H04N 13/257 348/47
2013/0326364 A1 12/2013 Latta et al.
2014/0118511 A1 * 5/2014 Hyde ................... H04N 13/366 348/54
2014/0152785 A1 * 6/2014 Chen .................... H04N 13/368 348/55
2014/0192168 A1 * 7/2014 Shimoyama ......... H04N 13/351 348/50
2014/0192329 A1 * 7/2014 Shin ....................... G03B 35/20 353/30
2014/0204078 A1 * 7/2014 Chen .................... H04N 13/376 345/419
2014/0254008 A1 * 9/2014 Tanioka ................. G02B 30/27 359/464
2014/0267614 A1 * 9/2014 Ding .................... H04N 13/275 348/46
2014/0320614 A1 * 10/2014 Gaudreau ............ H04N 13/366 348/51
2015/0029317 A1 * 1/2015 Kim ..................... H04N 13/383 348/59
2015/0049169 A1 * 2/2015 Krig ..................... H04N 13/211 348/46
2015/0085089 A1 * 3/2015 Shigemura ........... H04N 13/351 348/54
2015/0341626 A1 * 11/2015 Kim ..................... H04N 13/366 348/51
2016/0105660 A1 * 4/2016 Ito ........................ H04N 13/282 348/46
2016/0219268 A1 * 7/2016 Ström .................. H04N 13/398
2016/0267720 A1 * 9/2016 Mandella ............ G06F 3/03545
2016/0295200 A1 10/2016 Bruls
2016/0360187 A1 * 12/2016 Smithwick ............. G02B 30/27
2017/0161941 A1 * 6/2017 Lee ...................... H04N 13/117
2017/0171525 A1 * 6/2017 Koehle ................ H04N 13/204
2017/0188002 A1 6/2017 Chan et al.
2017/0257622 A1 * 9/2017 Seifert ................... G02B 30/31
2018/0082482 A1 3/2018 Motta et al.
2018/0268570 A1 9/2018 Budagavi et al.
2018/0278919 A1 * 9/2018 Lee ...................... H04N 13/243
2019/0088004 A1 * 3/2019 Lucas ..................... G06T 19/20
2019/0124313 A1 * 4/2019 Li ........................ H04N 13/324
2019/0146313 A1 * 5/2019 De La Cruz ......... G03B 21/142 345/581

(56) References Cited

U.S. PATENT DOCUMENTS

| | | | | |
|---|---|---|---|---|
| 2019/0149807 | A1* | 5/2019 | Akao | H04N 7/147 348/54 |
| 2019/0149809 | A1 | 5/2019 | Chen et al. | |
| 2019/0162950 | A1* | 5/2019 | Lapstun | H04N 13/243 |
| 2019/0166339 | A1* | 5/2019 | De La Cruz | G06T 5/80 |
| 2019/0180504 | A1* | 6/2019 | Pomerantz | G06T 15/20 |
| 2019/0227332 | A1* | 7/2019 | Qin | H04N 13/383 |
| 2019/0281280 | A1* | 9/2019 | Baldwin | G06T 7/70 |
| 2019/0297316 | A1* | 9/2019 | Bleyer | G06F 3/012 |
| 2019/0303594 | A1* | 10/2019 | Shimakawa | H04L 65/1089 |
| 2020/0035039 | A1* | 1/2020 | Adachi | G06T 15/20 |
| 2020/0051336 | A1* | 2/2020 | Ichikawa | G06T 19/006 |
| 2020/0106959 | A1* | 4/2020 | Molina | H04N 23/698 |
| 2020/0195900 | A1 | 6/2020 | Sodhi et al. | |
| 2020/0195911 | A1* | 6/2020 | Haseltine | H04N 13/305 |
| 2020/0267369 | A1* | 8/2020 | Nagasawa | H04N 13/282 |
| 2020/0304770 | A1* | 9/2020 | Iwata | H04N 13/117 |
| 2021/0120227 | A1* | 4/2021 | Masumura | H04N 13/376 |
| 2021/0132693 | A1* | 5/2021 | Pulli | G02B 27/0093 |
| 2021/0152848 | A1* | 5/2021 | Mizuno | H04N 19/115 |
| 2021/0185303 | A1* | 6/2021 | Valli | G02B 27/017 |
| 2021/0191251 | A1* | 6/2021 | Eckhouse | H04N 13/204 |
| 2021/0297653 | A1* | 9/2021 | Huang | G02B 30/27 |
| 2021/0344890 | A1* | 11/2021 | Namba | H04N 13/117 |
| 2021/0364988 | A1* | 11/2021 | Hornstein | H04N 13/376 |
| 2021/0377515 | A1* | 12/2021 | Aga | H04N 13/344 |
| 2021/0406541 | A1* | 12/2021 | Ulbricht | G06F 18/24 |
| 2022/0191455 | A1* | 6/2022 | Suzuki | H04N 13/125 |
| 2022/0198753 | A1* | 6/2022 | Sawhney | G06T 19/00 |
| 2022/0270323 | A1* | 8/2022 | Meléndez | G06V 20/64 |
| 2022/0308356 | A1* | 9/2022 | Makinen | G02B 27/30 |
| 2022/0311990 | A1* | 9/2022 | Makinen | G02B 3/0068 |
| 2022/0385885 | A1* | 12/2022 | Mitani | G02B 5/32 |
| 2023/0133982 | A1* | 5/2023 | Ecker | G06T 7/85 348/47 |
| 2023/0237735 | A1* | 7/2023 | Sato | G06T 17/00 345/419 |
| 2023/0281933 | A1 | 9/2023 | Pease et al. | |
| 2023/0298278 | A1 | 9/2023 | Da Veiga et al. | |
| 2023/0367386 | A1* | 11/2023 | Wilson | G02B 27/0101 |
| 2023/0403386 | A1 | 12/2023 | Da Veiga et al. | |
| 2024/0064360 | A1* | 2/2024 | Zhao | H04N 21/2662 |
| 2024/0214549 | A1* | 6/2024 | Gao | H04N 13/305 |
| 2024/0223738 | A1* | 7/2024 | Arimatsu | H04N 13/111 |
| 2024/0296621 | A1* | 9/2024 | Teranishi | G06T 7/593 |
| 2024/0372977 | A1* | 11/2024 | Hsiang | G09G 3/003 |
| 2024/0420411 | A1* | 12/2024 | Shimakawa | G06T 15/20 |
| 2025/0124629 | A1* | 4/2025 | Sato | G06F 3/013 |
| 2025/0168319 | A1* | 5/2025 | Shimizu | G02B 30/56 |
| 2025/0182419 | A1 | 6/2025 | Pease et al. | |
| 2025/0247513 | A1* | 7/2025 | Richter | H04N 13/111 |

OTHER PUBLICATIONS

C. Verleysen and C. De Vleeschouwer, "Piecewise-Planar 3D Approximation from Wide-Baseline Stereo," 2016 IEEE Conference on Computer Vision and Pattern Recognition (CVPR), Las Vegas, NV, USA, 2016, pp. 3327-3336, doi: 10.1109/CVPR.2016.362. (Year: 2016).*

H.-Y. Lin and Y.-H. Xiao, "Free-viewpoint image synthesis based on non-uniformly resampled 3D representation," 2010 IEEE International Conference on Image Processing, Hong Kong, China, 2010, pp. 2745-2748, doi: 10.1109/ICIP.2010.5652712. (Year: 2010).*

Y. Liu, X. Cao, Q. Dai and W. Xu, "Continuous depth estimation for multi-view stereo," 2009 IEEE Conference on Computer Vision and Pattern Recognition, Miami, FL, USA, 2009, pp. 2121-2128, doi: 10.1109/CVPR.2009.5206712. (Year: 2009).*

C. Lipski, F. Klose and M. Magnor, "Correspondence and Depth-Image Based Rendering a Hybrid Approach for Free-Viewpoint Video," in IEEE Transactions on Circuits and Systems for Video Technology, vol. 24, No. 6, pp. 942-951, Jun. 2014, doi: 10.1109/TCSVT.2014.2302379. (Year: 2014).*

European Patent Office (ISA/EP), International Search Report and Written Opinion of the International Searching Authority, International Application No. PCT/US2022/021243, 12 pages, Jun. 30, 2022.

Yang, Y. et al., "Stereo Image Point Cloud and Lidar Point Cloud Fusion for the 3D Street Mapping," Imaging & Geospatial Technology Forum (IGTF) 2017, ASPRS Annual Conference, 11 pages, Baltimore, MD, Mar. 11, 17/2017.

Zhen, W. et al., "A Joint Optimization Approach of LiDAR-Camera Fusion for Accurate Dense 3-D Reconstructions," IEEE Robotics and Automation Letters, vol. 4, No. 4, pp. 3585-3592, Oct. 2019.

China National Intellectual Property Administration, First Office Action and Search Report issued in Chinese Patent Application No. 202280025279.1 dated Apr. 8, 2026 with English translation (28 pages).

* cited by examiner

TECHNIQUES FOR VIEWING 3D PHOTOS AND 3D VIDEOS

CROSS-REFERENCE TO RELATED APPLICATIONS

This patent application is a continuation of International Application No. PCT/US2022/021243 filed Mar. 22, 2022, which claims the benefit of U.S. Provisional Application No. 63/168,320 filed Mar. 31, 2021, entitled "TECHNIQUES FOR VIEWING 3D PHOTOS AND 3D VIDEOS," each of which is incorporated herein by this reference in its entirety.

TECHNICAL FIELD

The present disclosure generally relates to viewing three-dimensional (3D) photos and 3D videos, and particularly to systems and techniques that enable transitioning between different types of views during the display of 3D photos and 3D videos.

BACKGROUND

Various techniques are used to present three-dimensional (3D) photos and 3D videos. Some techniques store a 3D photo as a stereo image (e.g., a pair of images for each of the right eye and left eye). Such 3D images are viewed by simultaneously presenting the respective image of the image pair to the appropriate eye. While stereo image-based techniques provide relatively high-quality representation of the 3D content, they are limited with respect to providing a viewing experience in which a user can change his or her viewpoint relative to the presented images. For example, such techniques would not be well suited for an extended reality (XR) viewing environment in which a 3D photo is positioned at a fixed position and orientation for the user to view from different viewpoints. Other 3D photo/3D video capturing/viewing techniques use 3D point clouds. Such techniques may store a 3D photo as a point cloud representing the 3D positions of points of the environment depicted in the 3D photo. Such point cloud-based 3D images may be viewed by using the point cloud to render views. While point cloud-based techniques may facilitate viewing environments in which a user is able to view a 3D photo from a greater variety of viewpoints, the resolution of the views is often limited and will typically be significantly less than the resolution provided by a stereo image-based technique. Thus, generally, existing techniques may not adequately enable a 3D photo/3D video viewing environment that provides both high resolution views of a 3D photo/3D video and the ability to view the 3D photo/3D video from a variety of viewpoints.

SUMMARY

Various implementations disclosed herein include devices, systems, and methods that display a three-dimensional (3D) content item (e.g., a 3D photo or 3D video) at a position within a 3D environment and provides different types of views of the 3D content item based on various criteria. For example, the type of view may differ based on the viewer/head position and/or the 3D content item location within the 3D environment. The view type transitions from a first type (e.g., a high quality stereo view in which each eye is presented a view based on stereo image pairs or a respective dense point cloud of a stereo point cloud) to a second type (e.g., a stereo view based on a single point cloud) in which each eye is presented a view based on rendering a single point cloud from a different respective viewing positions. The transition may use an animation to avoid undesirable effects and appearances. There may be an additional gradual or abrupt transition to a third type, which may be more abstract, e.g., depicting sparser point cloud points.

In general, one innovative aspect of the subject matter described in this specification can be embodied in methods, at an electronic device having a processor, that include the actions of obtaining a three-dimensional (3D) content item, the 3D content item including left eye content and right eye content generated based on camera images corresponding to left and right eye viewpoints. The methods provide a first view of the 3D content item at a position within a 3D environment. The first view includes a left eye view of the 3D content item that is based on the left eye content and a right eye view of the 3D content item that is based on the right eye content. The methods determine to transition from the first view to a second view of the 3D content item based on a criterion. The methods provide the second view of the 3D content item within the 3D environment. The second view includes the left eye view of the 3D content item that is based on a shared content item and the right eye view of the 3D content item that is based on the shared content item, where the shared content item comprises at least one of the left eye content and the right eye content.

These and other embodiments can each optionally include one or more of the following features.

In some aspects, the at least one of the left eye content and the right eye content includes the left eye content without the right eye content, the right eye content without the left eye content, or content generated based on the left eye content and the right eye content.

In some aspects, the left eye content and the right eye content includes a stereo camera image or a stereo point cloud generated based on a stereo camera image.

In some aspects, the method further includes providing a transitioning effect while transitioning from the first view to the second view, wherein providing the transitioning effect includes providing animated content when transitioning between the first view and the second view. In some aspects, the electronic device includes sensor data of a physical environment proximate the electronic device and providing the transitioning effect includes providing a view of the physical environment.

In some aspects, the criterion for determining to transition from the first view to the second view is based on a position of the electronic device or a user of the electronic device relative to a portion of the position of the 3D content item within the 3D environment.

In some aspects, criterion for determining to transition from the first view to the second view is based on a change in a gaze direction a user of the electronic device relative to the position of the 3D content item within the 3D environment.

In some aspects, the left eye content and right eye are based on depth data and the criterion for determining to transition from the first view to the second view is based on a change in quality of the depth data.

In some aspects, the criterion for determining to transition from the first view to the second view is based on a distance between the electronic device and the position of the 3D content item within the 3D environment.

In some aspects, the at least one of the left eye content and the right eye content includes a left eye point cloud of a stereo point cloud, a right eye point cloud of the stereo point cloud, or a combination of the left eye point cloud and right eye point cloud.

In some aspects, the left eye view of the 3D content item is not based on the right eye content, and the right eye view of the 3D content item is not based on the left eye content when providing the first view.

In some aspects, the method further includes determining to transition from the second view to a third view of the 3D content based on an additional criterion, and providing the third view of the 3D content in which the left eye view and right eye view are based on content that is sparser than the at least one of the left eye content and the right eye content.

In some aspects, the additional criterion used to determine to transition from the second view to the third view is based on a same type of criterion used to determine to transition from the first view to the second view.

In some aspects, the left eye content and right eye content are obtained based on depth data and light intensity image data.

In some aspects, the light intensity image data is based on light intensity image data for the right eye view from a first light intensity image sensor and light intensity image data for the left eye view from a second light intensity image sensor.

In some aspects, the depth data is based on depth data from a single depth sensor, depth data from a first depth sensor for the left eye and a second depth sensor the right eye, or depth data determined from the light intensity image data.

In some aspects, the 3D environment is an extended reality (XR) environment.

In some aspects, the electronic device is a head-mounted device (HMD).

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
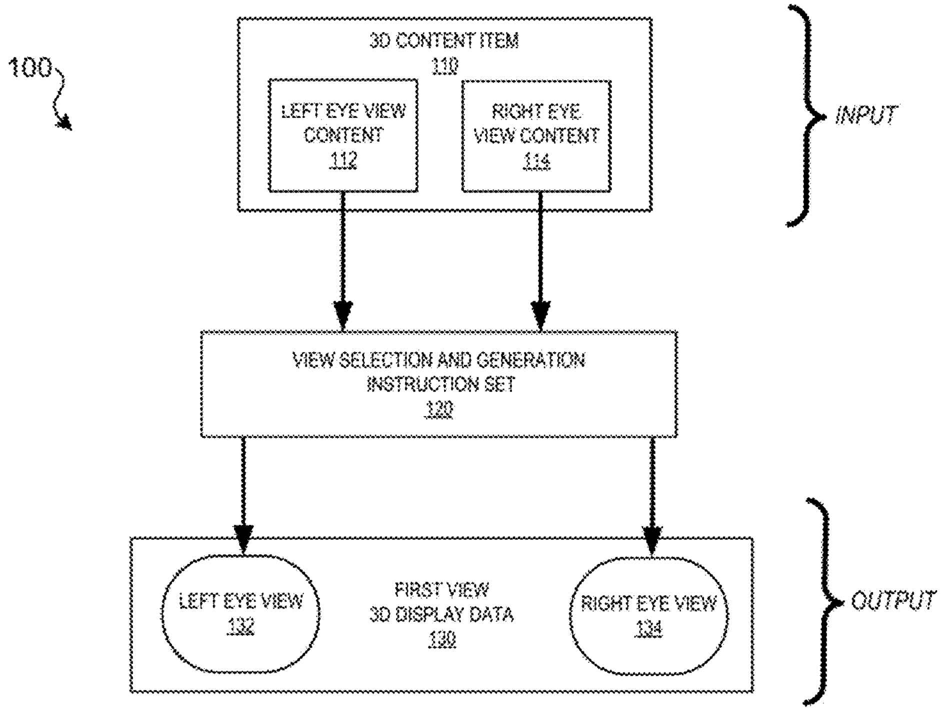
FIG. 1 is a block diagram that illustrates an example of generating a first view of display data of three-dimensional (3D) content in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous specific details are provided herein to afford those skilled in the art a thorough understanding of the claimed subject matter. However, the claimed subject matter may be practiced without these details. In other instances, methods, apparatuses, or systems, that would be known by one of ordinary skill, have not been described in detail so as not to obscure claimed subject matter.

Figure 2:
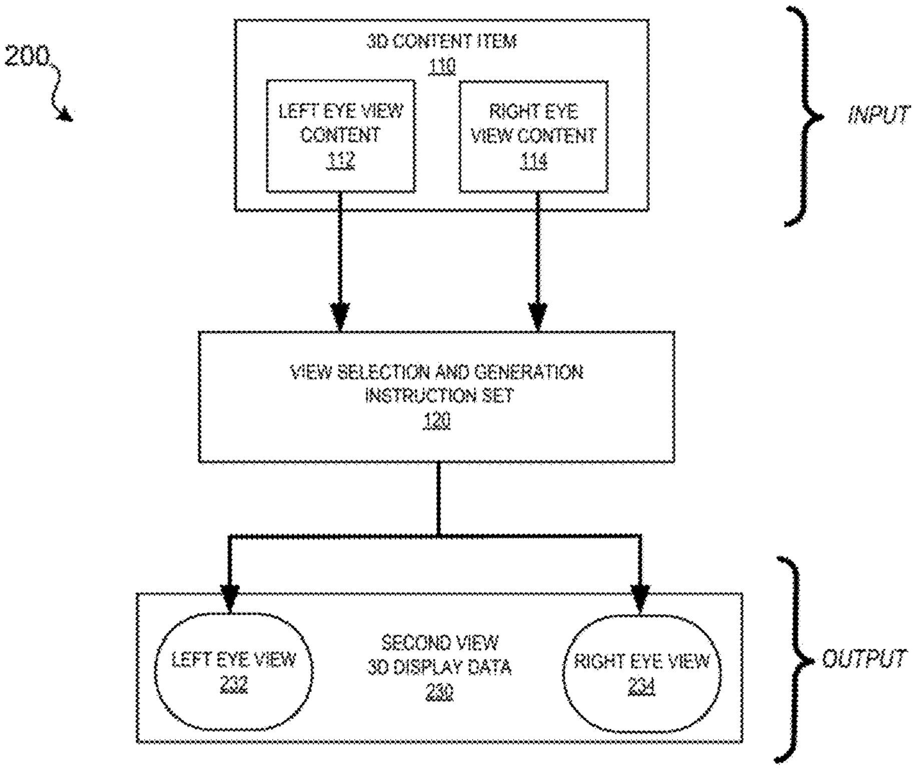
FIG. 2 is a block diagram that illustrates an example of generating a second view of display data of 3D content in accordance with some implementations.

Various techniques may be used to capture and present 3D display data (e.g., 3D photos and 3D videos). Such 3D display data may include stereoscopic data or monoscopic data from which 3D views can be generated (e.g., a point cloud). FIGS. 1 and 2 illustrate techniques for receiving 3D content data (e.g., 3D content item 110) and presenting the 3D display data as different views, such as stereoscopic (stereo) image data (e.g., RGB images with or without depth) or point cloud data (e.g., a dense stereo point cloud, a sparse point cloud, etc.) based on two different viewpoints for each eye.

FIG. 1 illustrates an example environment 100 in which a view selection and generation system obtains a 3D content item 110 and generates a first view of 3D display data 130. For example, the 3D display data 130 may include stereoscopic display data (e.g., a stereo image pair or a stereo point cloud including a separate point cloud for each eye based on the left eye content 112 and the right eye content 114 from the 3D content item 110).

FIG. 2 illustrates an example environment 200 in which a view selection and generation system obtains a 3D content item and generates a second view of 3D display data 230. For example, the second view of 3D display data 230 may include monoscopic display data (e.g., a point cloud obtained from either the left eye content 112 or the right eye content 114, or a point cloud generated from both the left eye content 112 and the right eye content 114).

The generation of different views of 3D display data of the example environments 100 and 200 is performed on a device, such as a mobile device, desktop, laptop, or server device. The 3D display data can be stored and/or displayed on the same or another device, e.g., on a device that has left eye and right eye displays for viewing stereoscopic images, such as a head-mounted device (HMD). The display data may be displayed in real-time as it is captured and/or displayed at a later time. In some implementations, the processes of the example environments 100 and 200 are performed by hardware, firmware, software, or a combination thereof. In some implementations, the processes of the example environments 100 and 200 are performed on a processor executing code stored in a non-transitory computer-readable medium (e.g., a memory).

The 3D content item 110 may include light intensity image data, depth data, and point cloud data captured for the two different viewpoints for each eye (e.g., left eye view content 112 and right eye view content 114). In some implementations, light intensity image data, depth data, and point cloud data are concurrently captured by a device to capture the 3D content item 110 (e.g., a user wearing an HMD capturing a 3D photo or video). Each environment 100 and 200 includes a display data composition pipeline that acquires or obtains sensor data (e.g., image sensor data from image sensors) of a physical environment. The composition pipeline may acquire sensor data (e.g., light intensity data, depth data, and position information) for a plurality of image frames and generate a rendering of the 3D content (e.g., a stereo image pair or one or more point clouds) based on the sensor data. The image sensors(s) may include cameras corresponding to left and right eye viewpoints, e.g., a first light intensity camera (e.g., RGB camera) that acquires light intensity image data for the left eye viewpoint and a second light intensity camera that acquires light intensity image data for the right eye viewpoint (e.g., a sequence of RGB image frames). The image sensors(s) may similarly include a first depth camera that acquires depth image data for the left eye viewpoint and a second depth camera that acquires depth image data for the right eye viewpoint of the physical environment. Alternatively, one depth sensor is utilized for both depth image data for the left eye viewpoint and the right eye viewpoint. Thus, the depth data is equivalent. Alternatively, the depth data can be determined based on the light intensity image data, thus not requiring a depth sensor.

Additionally, the system may include position sensors to acquire positioning information. For the positioning information, some implementations include a visual inertial odometry (VIO) system to determine equivalent odometry information using sequential camera images (e.g., light intensity data) to estimate the distance traveled. Alternatively, some implementations include a SLAM system (e.g., position sensors). The SLAM system may include a multidimensional (e.g., 3D) laser scanning and range measuring system that is GPS-independent and that provides real-time simultaneous location and mapping. The system may generate and manage data for an accurate point cloud that results from reflections of laser scanning from objects in an environment. Movements of any of the points in the point cloud are accurately tracked over time, so that the system can maintain precise understanding of its location and orientation as it travels through an environment, using the points in the point cloud as reference points for the location. The system may further be a visual SLAM system that relies on light intensity image data to estimate the position and orientation of the image sensor(s) and/or the device. The rendering for the left eye view content 112 and right eye view content 114 may be concurrently generated during the image acquisition, or may be generated by post processing techniques.

Example environment 100 includes a view selection and generation instruction set 120 that is configured with instructions executable by a processor to acquire 3D content data (e.g., 3D content item 110) and generate different views of 3D display data (e.g., first view 3D display data 130). The first view 3D display data 130 may be generated using a stereo pair of images or a stereo pair of point clouds based on left eye view content 112 and right eye view content 114. The first view 3D display data 130 may include stereoscopic images of 3D content item 110 in a 3D environment for a left eye view 132 and a right eye view 134 having a different perspective than left eye view 132. The left eye view 132 may depict a view of 3D content item 110 within a 3D environment from the perspective of a user's left eye and may be generated based on left eye view content 112. For example, a virtual shape or geometry may be positioned within the 3D environment and textured using the left eye view content 112. Left eye view 132 may be generated by rendering a view of the textured shape or geometry from the perspective of the user's left eye. A similar process may be used to generated right eye view 134 using a collocated shape or geometry textured instead with right eye view content 114. In some implementations, the stereo images of first view 3D display data 130 may provide a pixel perfect representation (e.g., based on camera image data) of 3D content item 110 within a 3D environment.

Example environment 200 includes the view selection and generation instruction set 120 that is configured with instructions executable by a processor to acquire 3D content data (e.g., 3D content item 110) and generate another view of 3D display data that is different than the first view 3D display data 130 (e.g., second view 3D display data 230). In some implementations, the second view 3D display data 230 may be generated using a single, shared content item. The second view 3D display data 230 may include a left eye view 232 that is based a shared content item and a right eye view 234 that is based on the same shared content item, where the shared content item is at least one of the left eye view content 112 and the right eye view content 114. The second view 3D display data 230 may be generated using a single dense or sparse point cloud representation of the 3D content item 110 (e.g., point cloud data from left eye view content 112, point cloud data from right eye view content 114, or point cloud data generated from a combination of left eye view content 112 and right eye view content 114). In some implementations, the second view 3D display data 230 may include stereoscopic images of 3D content item 110 in a 3D environment for a left eye view 232 and a right eye view 234 having a different perspective than left eye view 232. The left eye view 232 and right eye view 234 may depict a view of 3D content item 110 within a 3D environment from the perspective of a user's left eye and right eye, respectively, and may both be generated using the same singular point cloud representation of 3D content item 110. For example, the singular point cloud representation of the 3D content item 110 (e.g., point cloud data from left eye view content 112, point cloud data from right eye view content 114, or point cloud data generated from a combination of left eye view content 112 and right eye view content 114) may be positioned within the 3D environment. Left eye view 232 may be generated by rendering a view of the singular point cloud from the perspective of the user's left eye and right eye view 234 may be generated by rendering a view of the same singular point cloud from the perspective of the user's right eye.

Figure 3:
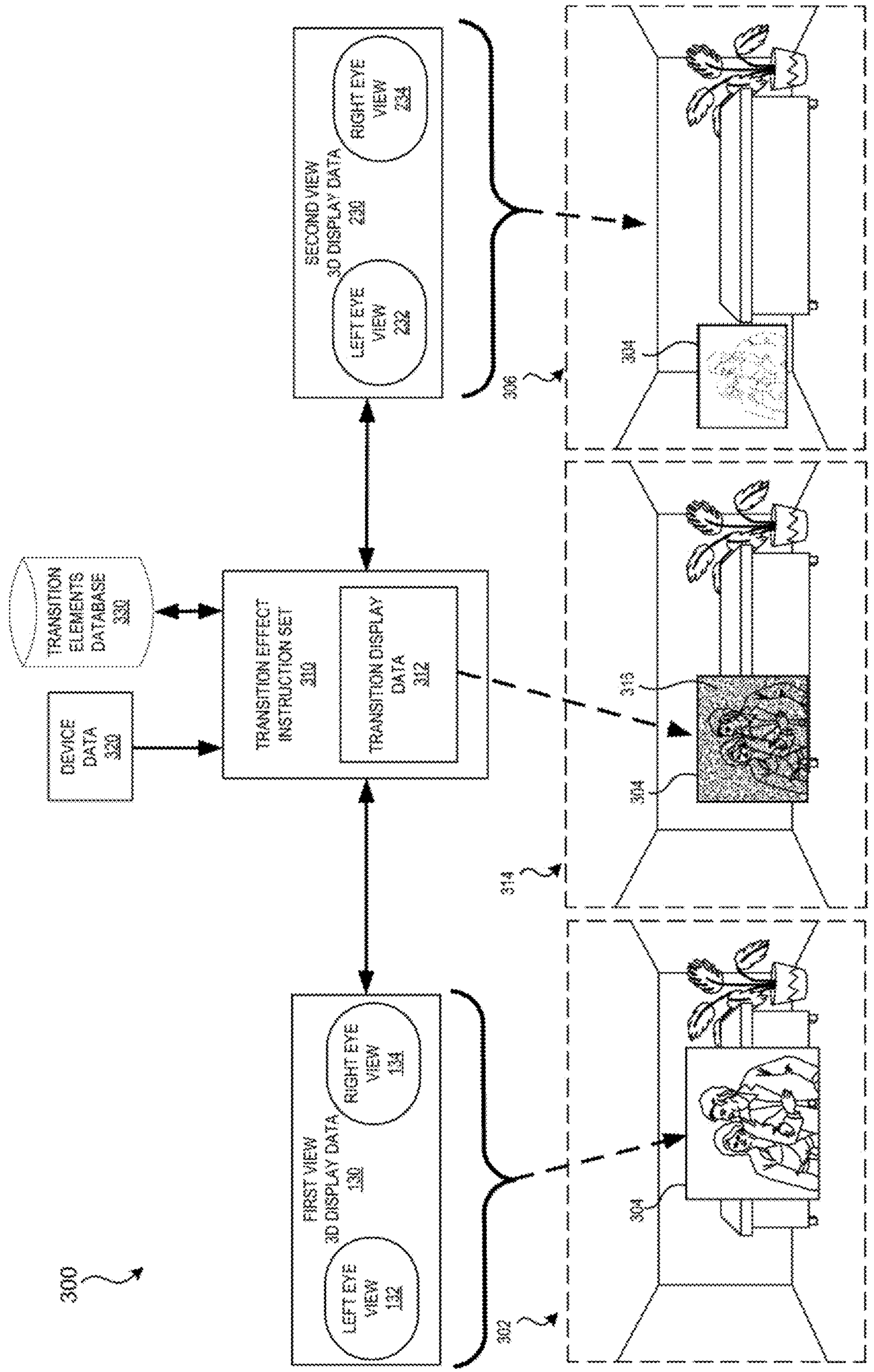
FIG. 3 is a system flow diagram of an example environment in which a system can provide transition effects between different types of views of 3D content in accordance with some implementations.

FIG. 3 illustrates a system flow diagram of an example environment 300 in which a transition effect instruction set 310 can provide transition effects between different types of views of 3D content. In some implementations, the system flow of the example environment 300 is performed on a device, such as a mobile device, desktop, laptop, or server device. The images of the example environment 300 can be displayed on the device that has a screen for displaying images and/or a screen for viewing stereoscopic images such as an HMD. In some implementations, the system flow of the example environment 300 is performed on processing logic, including hardware, firmware, software, or a combination thereof. In some implementations, the system flow of the example environment 300 is performed on a processor executing code stored in a non-transitory computer-readable medium (e.g., a memory).

An example system flow of the transition effect instruction set 310 of example environment 300 acquires a first set of image data (e.g., first view 3D display data 130), a second set of image data (e.g., the second view 3D display data 230), and/or device data 320 (e.g., image data from image source(s), ambient light data, position information, motion data, etc., from the device executing the system), and based on transition elements criteria from the transition elements database 330, determine whether to transition between views of 3D content item 304. For example, transitioning from a stereo image to a point cloud.

In an exemplary implementation, 3D content item 304, as illustrated in FIG. 3, is a 3D photograph application window that is overlaid on a view of a physical environment (e.g., an XR environment) such that user can view a 3D photo or 3D video within the window of the 3D content item 304. For example, view 302 represents a viewpoint of a device (e.g., a user's viewpoint wearing an HMD) of the first view 3D display data 130 (e.g., left eye view 132 and right eye view 134) that is displayed within 3D content item 304 (e.g., a stereo image). View 306 represents a viewpoint of a device of the second view 3D display data 230 (e.g., left eye view 232 and right eye view 234) that is displayed within 3D content item 304 (e.g., a point cloud). View 314 represents a viewpoint of a device of transitioning between the first and second view 3D display data 130 and 230, respectively, that is displayed within 3D content item 304 with transition effects as transition display data 312. The system flow of environment 300 for the transition effect instruction set 310 of transitioning from a first view to a second view is interchangeable and can include other additional views of display data and can transition back and forth between each different view of the 3D display data.

In some implementations, the transition effects may include a blurring and/or halo effect. For example, as illustrated in the 3D content item 304 of view 314, the transition includes blurring effect 316 as the 3D content item 304 is transitioning between stereoscopic image in view 302 (e.g., the first view 3D display data 130) and view 306 (e.g., the second view 3D display data 130). Alternatively, the transition effects may include a curtain effect, a sweep, a bubble view, animation effects, etc., such that the viewer is provided a noticeable change in the views occurring when transitioning in the type of views (e.g., stereo to mono).

In some implementations, the first view 3D display data 130 may transition to the second view 3D display data 230 based on viewer movement (e.g., a user wearing an HMD). For example, the transition effect may include transitioning to a full abstract representation (e.g., second view 3D display data 230 using a single point cloud) after detecting a user movement above a particular threshold (e.g., moving his or her head quickly) to further de-emphasize depth artifacts. For example, while a user is moving quickly through an XR environment, processing capabilities of the device, such as an HMD, may produce undesirable depth artifacts (e.g., noise). However, with the transitioning elements described herein, a fully abstract representation, such as a sparse point cloud that would require less processing capabilities, would provide a more enjoyable experience. When the same user stops moving his or her head to focus on a particular object within the XR environment, the views can be transitioned back to a higher quality stereo view (e.g., first view 3D display data using stereo images or point clouds) since there is minimal head motion.

In some implementations, the first view 3D display data 130 may transition to the second view 3D display data 230 based on a gaze convergence angle (or a physical distance) between the user or device and the object or set of objects that are within the current view. If the angle (or the physical distance) is too large, such as exceeding a convergence angle (or physical distance) threshold, then the system would implement a transition effect and transition from a stereo image(s) (e.g., first view 3D display data 130) to a mono or sparse point cloud image(s) (e.g., second view 3D display data 230). The angles may be determined based on a three-point triangle of a user's position, a projected 3D point of a pixel on an object for a left eye, and a projected 3D point of a pixel on an object for a right eye. As the two projected 3D points for the left and right eye view moves, the angle may become smaller or larger.

In some implementations, the first view 3D display data 130, as shown in view 302, includes a stereoscopic view of 3D content within a 3D environment based on higher quality light intensity image data and depth data. Alternatively, the first view 3D display data 130 includes a stereoscopic view of 3D content within a 3D environment based on a stereo pair of sparse or dense point clouds of 3D content (e.g., a 3D representation of a physical environment displayed in an XR environment). In some implementations, the second view 3D display data 230, as shown in view 306, includes a view of 3D content within a 3D environment based on lower quality (e.g., more noise) light intensity image data and depth data. Alternatively, the first view 3D display data 230 includes a view of 3D content within a 3D environment based on a sparse point cloud of 3D content (e.g., a 3D representation of a physical object displayed in an XR environment).

In some implementations, the first view 3D display data 130 may transition to the second view 3D display data 230 based on a change in quality of the depth data. For example, depending on the method of acquiring the depth data (e.g., via a depth sensor or estimated from RGB data), the depth quality may waiver based on any number of instances (movement of the device, user, or users head, depth sensor issues, computational issues estimating the depth data, etc.), such that the resulting stereo image (e.g., view 302) is noisy or produces several artifacts that may be undesirable. Thus, a transition to an abstract representation of view 302 (e.g., view 306) via a transition effect may be more desirable.

The implementations of the instruction sets described herein (e.g., view selection and generation instruction set 120 and transition effect instruction set 310) of example environments 100, 200, and 300, may be performed on an electronic device. In some implementations, the device is a handheld electronic device (e.g., a smartphone or a tablet). In some implementations, the device is a near-eye device such as a head worn device (e.g., a head mounted device (HMD)). The device utilizes one or more display elements to present views. For example, the device can display views that include 3D content in the context of an extended reality (XR) environment. In some implementations, the device may enclose the field-of-view of a user. In some implementations, the functionalities of device are provided by more than one device. In some implementations, the device communicates with a separate controller or server to manage and coordinate an experience for the user. Such a controller or server may be located in or may be remote relative to the physical environment.

People may sense or interact with a physical environment or world without using an electronic device. Physical features, such as a physical object or surface, may be included within a physical environment. For instance, a physical environment may correspond to a physical city having physical buildings, roads, and vehicles. People may directly sense or interact with a physical environment through various means, such as smell, sight, taste, hearing, and touch. This can be in contrast to an extended reality (XR) environment that may refer to a partially or wholly simulated environment that people may sense or interact with using an electronic device. The XR environment may include virtual reality (VR) content, mixed reality (MR) content, augmented reality (AR) content, or the like. Using an XR system, a portion of a person's physical motions, or representations thereof, may be tracked and, in response, properties of virtual objects in the XR environment may be changed in a way that complies with at least one law of nature. For example, the XR system may detect a user's head movement and adjust auditory and graphical content presented to the user in a way that simulates how sounds and views would change in a physical environment. In other examples, the XR system may detect movement of an electronic device (e.g., a laptop, tablet, mobile phone, or the like) presenting the XR environment. Accordingly, the XR system may adjust auditory and graphical content presented to the user in a way that simulates how sounds and views would change in a physical environment. In some instances, other inputs, such as a representation of physical motion (e.g., a voice command), may cause the XR system to adjust properties of graphical content.

Numerous types of electronic systems may allow a user to sense or interact with an XR environment. A non-exhaustive list of examples includes lenses having integrated display capability to be placed on a user's eyes (e.g., contact lenses), heads-up displays (HUDs), projection-based systems, head mountable systems, windows or windshields having integrated display technology, headphones/earphones, input systems with or without haptic feedback (e.g., handheld or wearable controllers), smartphones, tablets, desktop/laptop computers, and speaker arrays. Head mountable systems may include an opaque display and one or more speakers. Other head mountable systems may be configured to receive an opaque external display, such as that of a smartphone. Head mountable systems may capture images/video of the physical environment using one or more image sensors or capture audio of the physical environment using one or more microphones. Instead of an opaque display, some head mountable systems may include a transparent or translucent display. Transparent or translucent displays may direct light representative of images to a user's eyes through a medium, such as a hologram medium, optical waveguide, an optical combiner, optical reflector, other similar technologies, or combinations thereof. Various display technologies, such as liquid crystal on silicon, LEDs, uLEDs, OLEDs, laser scanning light source, digital light projection, or combinations thereof, may be used. In some examples, the transparent or translucent display may be selectively controlled to become opaque. Projection-based systems may utilize retinal projection technology that projects images onto a user's retina or may project virtual content into the physical environment, such as onto a physical surface or as a hologram.

Figure 4:
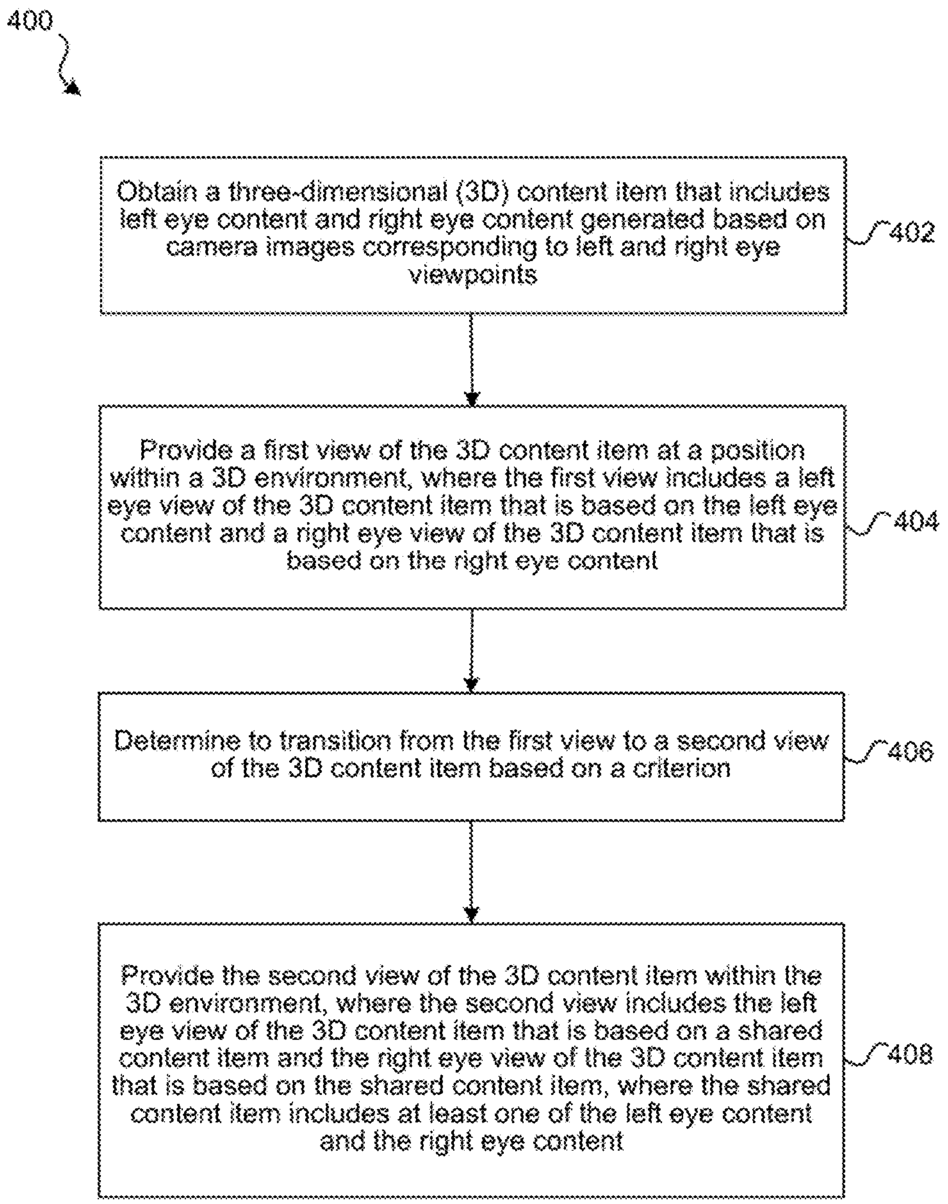
FIG. 4 is a flowchart representation of an exemplary method that provides a transition between different types of views of 3D content in accordance with some implementations.

FIG. 4 is a flowchart representation of an exemplary method 400 that determines and provides a transition (optionally including a transition effect) between different types of views of 3D content in accordance with some implementations. In some implementations, the method 400 is performed by a device, such as a mobile device, desktop, laptop, or server device. In some implementations, the device has a screen for displaying images and/or a screen for viewing stereoscopic images such as a head-mounted display (HMD). In some implementations, the method 400 is performed by processing logic, including hardware, firmware, software, or a combination thereof. In some implementations, the method 400 is performed by a processor executing code stored in a non-transitory computer-readable medium (e.g., a memory). The content presentation process of method 400 is illustrated with examples with reference to FIG. 3.

At block 402, the method 400 obtains a 3D content item. The 3D content item may include left eye content and right eye content generated based on camera images corresponding to left and right eye viewpoints (e.g., a left eye view and a right eye view). The left eye content and the right eye content may include a stereo camera image or a stereo point cloud generated based on a stereo camera image. The left eye content and right eye content could include previously-captured points clouds and/or 3D images of an object. In some implementations, the at least one of the left eye content and the right eye content includes a left eye point cloud of a stereo point cloud, a right eye point cloud of the stereo point cloud, or a combination of the left eye point cloud and right eye point cloud.

In some implementations, the left eye content and right eye content may be generated based on an RGB camera for each eye and a separate depth camera for each eye. Alternatively, the left eye content and right eye content may be generated based on RGB images for each eye (e.g., two separate RGB sensors), but only a single depth camera such that the depth data is used for both the right eye content and the left eye content. Alternatively, the left eye content and right eye content may be generated based on RGB images for each eye (e.g., two separate RGB sensors), but using just RGB images for the depth data. For example, depth data may be estimated from the light intensity image data by using a convolutional neural network to generate a depth map from the RGB data in the images.

As discussed herein with reference to FIG. 1, the left eye view 132 may depict a view of 3D content item 110 within a 3D environment from the perspective of a user's left eye and may be generated based on left eye view content 112. For example, a virtual shape or geometry may be positioned within the 3D environment and textured using the left eye view content 112. Left eye view 132 may be generated by rendering a view of the textured shape or geometry from the perspective of the user's left eye. A similar process may be used to generated right eye view 134 using a collocated shape or geometry textured instead with right eye view content 114. In some implementations, the stereo images of first view 3D display data 130 may provide a pixel perfect representation (e.g., based on camera image data) of 3D content item 110 within a 3D environment. For example, if re-projecting a point cloud, the further a user moves away, the larger the error gets if the depth is not correct. By keeping the view of the content separate for each eye, each individual reprojection is smaller which provides better perception. However, if the depth is moved beyond a threshold, then the left eye content and the right eye content could collapse into transitions and other rendering methods.

At block 404, the method 400 provides a first view of the 3D content item at a position within a 3D environment in which a left eye view of the 3D content item is based on the left eye content and a right eye view of the 3D content item is based on the right eye content. For example, as illustrated in view 302 of FIG. 3, a stereo image (high quality image) as 3D content item 304 is displayed for a user that includes light intensity image data and depth data for both the left eye and the right eye (e.g., while a user is wearing a HMD). For example, a user is viewing a 3D photo in an application window overlaid on a view of a physical environment. In some implementations, when providing the first view the left eye view of the 3D content item is not based on the right eye content, and the right eye view of the 3D content item is not based on the left eye content.

At block 406, the method 400 determines to transition from the first view to a second view of the 3D content item based on a criterion. For example, as illustrated in view 314 of FIG. 3, the transition instruction set 310 obtains device data 320 and data from transition elements database 330 to determine to transition from view 302 (e.g., stereo view) to view 306 (e.g., a point cloud) via a transition view 314 (e.g., via transition effects). Transitioning from the first view to a second view may depend upon a user's position or a user's head position and/or location of particular portions of the content relative to the user/head.

At block 408, the method 400 provides the second view of the 3D content item within the 3D environment, where the second view includes the left eye view of the 3D content that is based on a shared content item and the right eye view of the 3D content item that is based on the shared content item, where the shared content item includes at least one of the left eye content and the right eye content. For example, as illustrated in view 306 of FIG. 3, the 3D content item 304 is transitioned to and displayed as a point cloud. In some implementations, the at least one of the left eye content and the right eye content includes only the left eye content, only the right eye content, or content generated based on the left eye content and the right eye content.

In some implementations, the method 400 further includes providing a transitioning effect while transitioning from the first view to the second view. For example, an animation such as a curtain effect or a sweep effect, may be used to transition between the first view and the second view. For example, as illustrated in view 314 of FIG. 3, the transition effect of blurring effect 316 is displayed to the user to signify the change of views from view 302 to view 306 is occurring because of some detected criterion or change in a detected attribute (e.g., distance of the user to the content item, a change in gaze, etc.).

In some implementations, the electronic device includes sensor data that provides a third view of a physical environment and providing the transitioning effect includes providing within a portion of the second view a portion of the third view of the physical environment (e.g., the transition effect could be showing part of the real world so the user doesn't bump into something). For example, while wearing an HMD while viewing an XR environment, a user may be viewing all virtual (e.g., reconstructed) 3D content while moving around a physical environment (e.g., viewing a reconstructed room layout that includes all different furniture while in the same physical room with different locations of different real physical furniture). Thus, while the user is moving around viewing the virtual content in the XR environment, he or she may be about run into a physical object, so based on detecting this, a transition effect instruction set could provide a transition effect showing the user a partial view of the physical world (e.g., the object the user was about to bump into), using one or more of the transition effects described herein (e.g., halo/blur effect, curtain effect, and the like).

In some implementations, the criterion for determining to transition from the first view to the second view is based on a position of the electronic device or a user of the electronic device relative to a portion of the position of the 3D content item within the 3D environment, such as based on a position of a user's head or location of particular portions of the 3D content relative to the user's head. The transition effects may be determined based on viewer movement (e.g., a user wearing an HMD while walking around a physical environment). For example, the transition effect may include transitioning to a full abstract representation (e.g., a sparse point cloud) after detecting a user movement above a particular threshold (e.g., moving his or her head quickly) to further de-emphasize depth artifacts. For example, while a user is moving quickly through an XR environment, processing capabilities of the device, such as an HMD, may produce undesirable depth artifacts (e.g., noise). However, with the transitioning elements described herein, a fully abstract representation, such as a sparse point cloud that would require less processing capabilities, would provide a more enjoyable experience. When the same user stops moving his or her head to focus on a particular object within the XR environment, the views can be transitioned back to a higher quality stereo view since there is minimal head motion.

In some implementations, criterion for determining to transition from the first view to the second view is based on a change in a gaze direction a user of the electronic device relative to the position of the 3D content item within the 3D environment. For example, the transition effects may be determined based on a convergence angle between the user or device and the object or set of objects that are within the current view. If the angle is too large, such as exceeding a convergence angle threshold, then the system would implement a transition effect and transition from a stereo image(s) to a mono or sparse point cloud image(s). Additionally, or alternatively, gaze angle of a user may be used as a trigger similar to the convergence angle. The angles may be determined based on a three-point triangle of a user's position, a projected 3D point of a pixel on an object for a left eye, and a projected 3D point of a pixel on an object for a right eye. As the two projected 3D points for the left and right eye view moves, the angle may become smaller or larger.

In some implementations, the criterion for determining to transition from the first view to the second view is based on a distance between the electronic device and the object (e.g., transition based on scene depth, and a threshold distance). For example, the transition effects may be determined based on a distance between the user or device and the object or set of objects that are within the current view. If the distance is too large, such as exceeding a distance threshold, then the system would implement a transition effect and transition from a stereo image(s) to a mono or sparse point cloud image(s). The distance may be determined based on a user's or device's position and the projected 3D points of a pixel on an object for a left eye and/or right eye.

In some implementations, there may be another transition to a third view of the 3D content item that may be more abstract (e.g., based on a sparser point cloud). For example, the method 400 may further include determining to transition from the second view to a third view of the 3D content based on an additional criterion, and providing the third view of the 3D content in which the left eye view and right eye view are based on content that is sparser than the at least one of the left eye content and the right eye content. For example, as illustrated in view 306 of FIG. 3, a sparse point cloud image is displayed for a user that includes an abstract representation of the objects in view 302. In some implementations, a first transition is from a high-quality stereo image (e.g., view 304) to a lower quality mono image (e.g., the third point cloud), then a second transition could include a transition to a different view of content (e.g., an even more sparse abstract representation). The additional criterion used to determine to transition from the second view to the third view may be based on a same type of criterion used to determine to transition from the first view to the second view (e.g., distance, gaze convergence angle, rate of movement of the device/user, and the like).

In some implementations, the stereo point cloud includes depth data and the criterion for determining to transition from the first view to the second view is based on a change in quality of the depth data. For example, depending on the method of acquiring the depth data (e.g., via a depth sensor or estimated from RGB data), the depth quality may waiver based on any number of instances (movement of the device, user, or user's head, depth sensor issues, computational issues estimating the depth data, etc.), such that the resulting stereo image (e.g., view 302) is noisy or produces several artifacts that may be undesirable. Thus, a transition to an abstract representation of view 302 (e.g., view 304) via a transition effect may be more desirable.

The stereo images (stereo point cloud representing 3D content) may provide a pixel perfect representation of 3D content within a 3D environment, but may limit the viewer's ability to move their head away from the "sweet spot" while wearing an HMD (e.g., the place where a 3D camera captured the image/video and would provide the highest image quality). In some implementations, transitioning to the second view may include indicators (e.g., transition effects), such as animation, that directs the user to view an object at a different viewing angle in order to see the object from the highest image quality (e.g., the "sweet spot"). Thus, the transition effects described herein could be used to direct a user within an XR environment to particular viewpoints in order have a more desirable effect (e.g., better image quality, less artifacts, and the like).

In some implementations, in order to allow for a transition between the first, second, and third views in method 400, a capturing device may concurrently capture different representations of an environment. For example, the capture device may be configured to concurrently capture a stereo pair of images and optionally depth data, a single or stereo pair of point clouds, a lower quality stereo pair of images or single/stereo pair of point cloud(s), or a combination thereof. By having these different representations of the same subject, a viewing device may switch between views of the same subject as described above.

Figure 5:
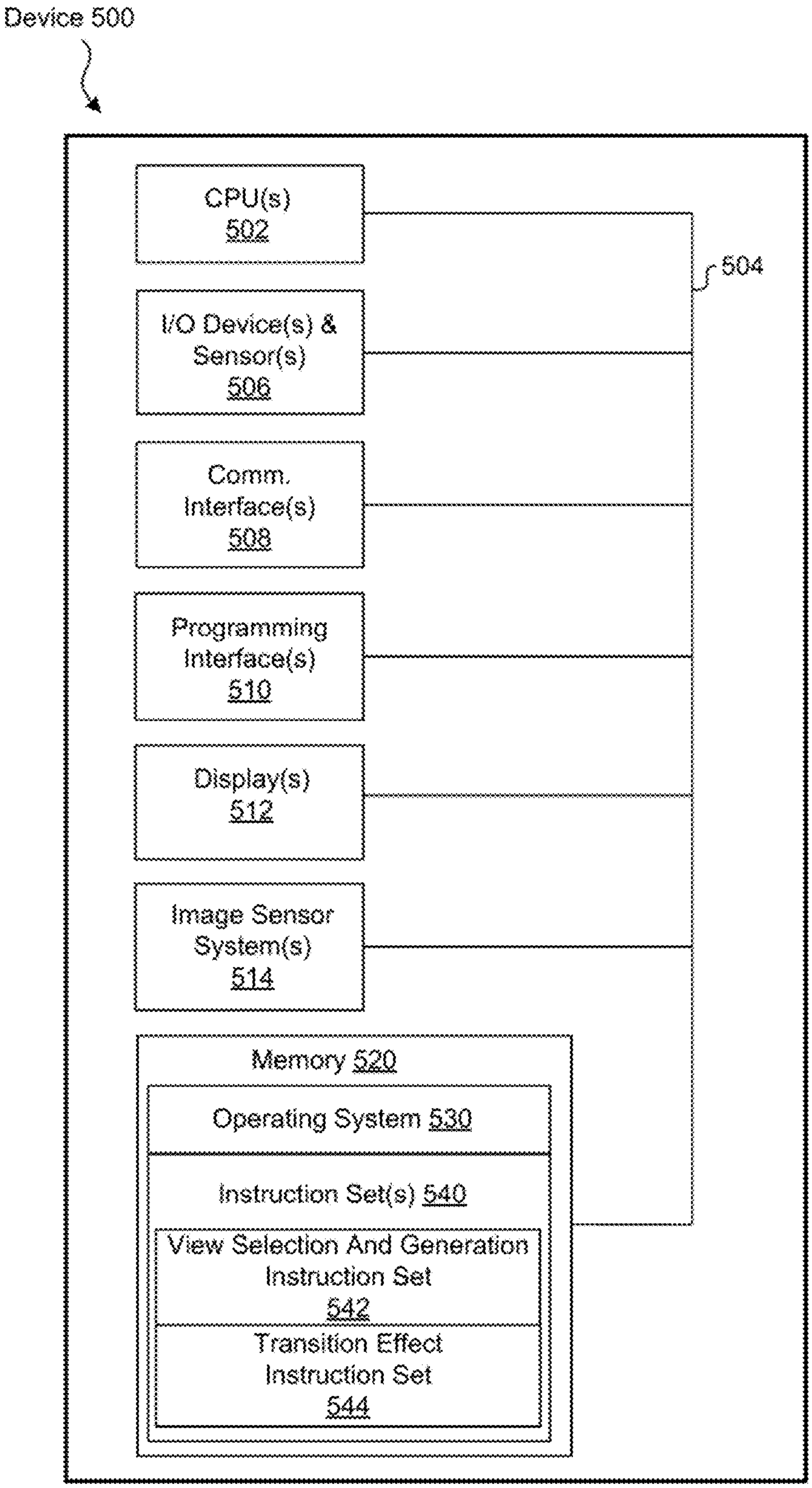
FIG. 5 is an example device in accordance with some implementations.

FIG. 5 is a block diagram of an example device 500. Device 500 illustrates an exemplary device configuration for the device used to implement environment 100 of FIG. 1. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 500 includes one or more processing units 502 (e.g., microprocessors, ASICs, FPGAs, GPUs, CPUs, processing cores, and/or the like), one or more input/output (I/O) devices and sensors 506, one or more communication interfaces 508 (e.g., USB, FIREVVIRE, THUNDERBOLT, IEEE 802.3x, IEEE 802.11x, IEEE 802.16x, GSM, CDMA, TDMA, GPS, IR, BLUETOOTH, ZIGBEE, SPI, 120, and/or the like type interface), one or more programming (e.g., I/O) interfaces 510, one or more displays 512, one or more interior and/or exterior facing image sensor systems 514, a memory 520, and one or more communication buses 504 for interconnecting these and various other components.

In some implementations, the one or more communication buses 504 include circuitry that interconnects and controls communications between system components. In some implementations, the one or more I/O devices and sensors 506 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 512 are configured to present a view of a physical environment or a graphical environment to the user. In some implementations, the one or more displays 512 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 512 correspond to diffractive, reflective, polarized, holographic, etc. waveguide displays. In one example, the device 500 includes a single display. In another example, the device 500 includes a display for each eye of the user.

In some implementations, the one or more image sensor systems 514 are configured to obtain image data that corresponds to at least a portion of the physical environment 105. For example, the one or more image sensor systems 514 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 514 further include illumination sources that emit light, such as a flash. In various implementations, the one or more image sensor systems 514 further include an on-camera image signal processor (ISP) configured to execute a plurality of processing operations on the image data.

In some implementations, the device 500 includes an eye tracking system for detecting eye position and eye movements (e.g., eye gaze detection). For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user. Moreover, the illumination source of the device 10 may emit NIR light to illuminate the eyes of the user and the NIR camera may capture images of the eyes of the user. In some implementations, images captured by the eye tracking system may be analyzed to detect position and movements of the eyes of the user, or to detect other information about the eyes such as pupil dilation or pupil diameter. Moreover, the point of gaze estimated from the eye tracking images may enable gaze-based interaction with content shown on the near-eye display of the device 500.

The memory 520 includes high-speed random-access memory, such as DRAM, SRAM, DDR RAM, or other random-access solid-state memory devices. In some implementations, the memory 520 includes non-volatile memory, such as one or more magnetic disk storage devices, optical disk storage devices, flash memory devices, or other non-volatile solid-state storage devices. The memory 520 optionally includes one or more storage devices remotely located from the one or more processing units 502. The memory 520 includes a non-transitory computer readable storage medium.

In some implementations, the memory 520 or the non-transitory computer readable storage medium of the memory 520 stores an optional operating system 530 and one or more instruction set(s) 540. The operating system 530 includes procedures for handling various basic system services and for performing hardware dependent tasks. In some implementations, the instruction set(s) 540 include executable software defined by binary information stored in the form of electrical charge. In some implementations, the instruction set(s) 540 are software that is executable by the one or more processing units 502 to carry out one or more of the techniques described herein.

The instruction set(s) 540 include a view selection and generation instruction set 542 and a transition effect instruction set 544. The instruction set(s) 540 may be embodied as a single software executable or multiple software executables.

The view selection and generation instruction set 542 (e.g., view selection and generation instruction set 120 of FIGS. 1 and 2) is executable by the processing unit(s) 502 to generate one or more different views 3D display data. For example, the view selection and generation instruction set 542 obtains a 3D content item (e.g., 3D photo or video), determines a view selection, and generates 3D display data for the determined view. For example, a 3D content item that is obtained includes different sets of image data (e.g., RGB images, depth data, and point cloud representations) such that the view selection and generation instruction set 542 analyzes the image data to generate a particular view so that a user, during execution of the application, views the 3D photo or video as an overlay on top of the 3D representation, as illustrated herein with reference to FIGS. 1-3.

The transition effect instruction set 544 (e.g., transition effect instruction set 310 of FIG. 3) is configured with instructions executable by a processor to acquires a first set of image data (e.g., first view 3D display data 130), a second set of image data (e.g., the second view 3D display data 230), and/or device data 320 (e.g., image data from image source(s), ambient light data, position information, motion data, etc., from the device executing the system), and based on transition elements criteria from the transition elements database 330, determine whether to transition between views of 3D content item 304. For example, as discussed herein with reference to FIG. 3, the user transition effect instruction set 544 can obtain two or more views of a 3D photo of video (e.g., a stereo image and a point cloud) during the execution of a photo/video viewer application program and based on some criterion (e.g., user/head movement, etc.) from device data 320, transition between the two or more views using transition effects from the transition elements database 330.

Although the instruction set(s) 540 are shown as residing on a single device, it should be understood that in other implementations, any combination of the elements may be located in separate computing devices. Moreover, FIG. 5 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Those of ordinary skill in the art will appreciate that well-known systems, methods, components, devices, and circuits have not been described in exhaustive detail so as not to obscure more pertinent aspects of the example implementations described herein. Moreover, other effective aspects and/or variants do not include all of the specific details described herein. Thus, several details are described in order to provide a thorough understanding of the example aspects as shown in the drawings. Moreover, the drawings merely show some example embodiments of the present disclosure and are therefore not to be considered limiting.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, e.g., one or more modules of computer program instructions, encoded on computer storage medium for execution by, or to control the operation of, data processing apparatus. Alternatively, or additionally, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel. The operations described in this specification can be implemented as operations performed by a data processing apparatus on data stored on one or more computer-readable storage devices or received from other sources.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:

at an electronic device having a processor:

obtaining a three-dimensional (3D) content item, the 3D content item comprising eye specific content comprising left eye content and right eye content generated based on camera images corresponding to left and right eye viewpoints;

providing a first view of the 3D content item at a position within a 3D environment, wherein the first view comprises a left eye view of the 3D content item that is based on rendering the left eye content and a right eye view of the 3D content item that is based on rendering the right eye content;

determining to transition from the first view that is based on rendering the eye-specific content to provide each of the left and right eye views to a second view of the 3D content item that is based on rendering a single shared point cloud representation to provide both of the left and right eye views, wherein determining to transition is based on a criterion, wherein the criterion is based on at least one of a change in quality of depth data, a gaze convergence angle threshold, and a distance threshold between the electronic device and the 3D content item;

providing the second view of the 3D content item within the 3D environment, wherein the second view comprises the left eye view of the 3D content item that is based on the single shared point cloud representation and the right eye view of the 3D content item that is based on the single shared point cloud representation, wherein the single shared point cloud representation is derived from at least one of the left eye content and the right eye content; and providing a transition effect while transitioning from the first view to the second view, wherein the transition effect comprises at least one of a blurring effect, a halo effect, a curtain effect, or an animation effect.

2. The method of claim 1, wherein the at least one of the left eye content and the right eye content comprises:

the left eye content without the right eye content;

the right eye content without the left eye content; or content generated based on the left eye content and the right eye content.

3. The method of claim 1, wherein the left eye content and the right eye content comprise a stereo camera image or a stereo point cloud generated based on a stereo camera image.

4. The method of claim 1, wherein providing the transitioning effect includes providing animated content when transitioning between the first view and the second view.

5. The method of claim 4, wherein the electronic device includes sensor data of a physical environment proximate the electronic device and providing the transitioning effect includes providing a view of the physical environment.

6. The method of claim 1, wherein the criterion for determining to transition from the first view to the second view is based on a position of the electronic device or a user of the electronic device relative to a portion of the position of the 3D content item within the 3D environment.

7. The method of claim 1, wherein the criterion for determining to transition from the first view to the second view is based on a change in a gaze direction of a user of the electronic device relative to the position of the 3D content item within the 3D environment.

8. The method of claim 1, wherein the left eye content and right eye are based on depth data and the criterion for determining to transition from the first view to the second view is based on a change in quality of the depth data.

9. The method of claim 1, wherein the criterion for determining to transition from the first view to the second view is based on a distance between the electronic device and the position of the 3D content item within the 3D environment.

10. The method of claim 1, wherein the at least one of the left eye content and the right eye content comprises a left eye point cloud of a stereo point cloud, a right eye point cloud of the stereo point cloud, or a combination of the left eye point cloud and right eye point cloud.

11. The method of claim 1, wherein the left eye view of the 3D content item is not based on the right eye content, and the right eye view of the 3D content item is not based on the left eye content when providing the first view.

12. The method of claim 1, further comprising:

determining to transition from the second view to a third view of the 3D content based on an additional criterion; and providing the third view of the 3D content in which the left eye view and the right eye view are based on more abstract content than the at least one of the left eye content and the right eye content, wherein the more abstract content comprises a point cloud representation that is more sparse than a point cloud representation associated with the at least one of the left eye content and the right eye content.

13. The method of claim 12, wherein the additional criterion used to determine to transition from the second view to the third view is based on a same type of criterion used to determine to transition from the first view to the second view.

14. The method of claim 1, wherein the left eye content and right eye content are obtained based on depth data and light intensity image data.

15. The method of claim 14, wherein the light intensity image data is based on light intensity image data for the right eye viewpoint from a first light intensity image sensor and light intensity image data for the left eye viewpoint from a second light intensity image sensor.

16. The method of claim 14, wherein the depth data is based on depth data from a single depth sensor, depth data from a first depth sensor for the left eye and a second depth sensor the right eye, or depth data determined from the light intensity image data.

17. The method of claim 1, wherein the 3D environment is an extended reality (XR) environment.

18. The method of claim 1, wherein the electronic device is a head-mounted device (HMD).

19. The method of claim 1, wherein the criterion is based on a change in quality of depth data.

20. The method of claim 1, wherein the criterion is based on a distance threshold between the electronic device and the 3D content item.

21. A device comprising:

a non-transitory computer-readable storage medium; and one or more processors coupled to the non-transitory computer-readable storage medium, wherein the non-transitory computer-readable storage medium comprises program instructions that, when executed on the one or more processors, cause the one or more processors to perform operations comprising:

obtaining a three-dimensional (3D) content item, the 3D content item comprising eye specific content comprising left eye content and right eye content generated based on camera images corresponding to left and right eye viewpoints;

providing a first view of the 3D content item at a position within a 3D environment, wherein the first view comprises a left eye view of the 3D content item that is based on rendering the left eye content and a right eye view of the 3D content item that is based on rendering the right eye content;

determining to transition from the first view that is based on rendering the eye-specific content to provide each of the left and right eye views to a second view of the 3D content item that is based on rendering a single shared point cloud representation to provide both of the left and right eye views, wherein determining to transition is based on a criterion, wherein the criterion is based on at least one of a change in quality of depth data, a gaze convergence angle threshold, and a distance threshold between the device and the 3D content item;

providing the second view of the 3D content item within the 3D environment, wherein the second view comprises the left eye view of the 3D content item that is based on the single shared point cloud representation and the right eye view of the 3D content item that is based on the single shared point cloud representation, wherein the single shared point cloud representation is derived from at least one of the left eye content and the right eye content; and providing a transition effect while transitioning from the first view to the second view, wherein the transition effect comprises at least one of a blurring effect, a halo effect, a curtain effect, or an animation effect.

22. A non-transitory computer-readable storage medium, storing computer-executable program instructions on a device to perform operations comprising:

obtaining a three-dimensional (3D) content item, the 3D content item comprising eye specific content comprising left eye content and right eye content generated based on camera images corresponding to left and right eye viewpoints;

providing a first view of the 3D content item at a position within a 3D environment, wherein the first view comprises a left eye view of the 3D content item that is based on rendering the left eye content and a right eye view of the 3D content item that is based on rendering the right eye content;

determining to transition from the first view that is based on rendering the eye-specific content to provide each of the left and right eye views to a second view of the 3D content item that is based on rendering a single shared point cloud representation to provide both of the left and right eye views, wherein determining to transition is based on a criterion, wherein the criterion is based on at least one of a change in quality of depth data, a gaze convergence angle threshold, and a distance threshold between the device and the 3D content item;

providing the second view of the 3D content item within the 3D environment, wherein the second view comprises the left eye view of the 3D content item that is based on the single shared point cloud representation and the right eye view of the 3D content item that is based on the single shared point cloud representation, wherein the single shared point cloud representation is derived from at least one of the left eye content and the right eye content; and providing a transition effect while transitioning from the first view to the second view, wherein the transition effect comprises at least one of a blurring effect, a halo effect, a curtain effect, or an animation effect.

* * * * *